(12) United States Patent
Zhu

(10) Patent No.: US 10,145,441 B2
(45) Date of Patent: Dec. 4, 2018

(54) VISCOUS ISOLATOR WITH AIR SPRING

(71) Applicant: XCMG American Research Corporation, St. Paul, MN (US)

(72) Inventor: Lin Zhu, Dunlap, IL (US)

(73) Assignee: XCMG American Research Corporation, St. Paul, MN (US)

( * ) Notice: Subject to any disclaimer, the term of this patent is extended or adjusted under 35 U.S.C. 154(b) by 3 days.

(21) Appl. No.: 15/184,743

(22) Filed: Jun. 16, 2016

(65) Prior Publication Data

US 2017/0363172 A1 Dec. 21, 2017

(51) Int. Cl.
| | |
|---|---|
| *F16M 1/00* | (2006.01) |
| *F16F 13/00* | (2006.01) |
| *B60K 5/12* | (2006.01) |
| *B62D 33/06* | (2006.01) |
| *F16F 13/10* | (2006.01) |
| *F16F 13/20* | (2006.01) |

(52) U.S. Cl.
CPC .......... *F16F 13/002* (2013.01); *B60K 5/1208* (2013.01); *B62D 33/0608* (2013.01); *F16F 13/007* (2013.01); *F16F 13/101* (2013.01); *F16F 13/20* (2013.01); *F16F 2228/066* (2013.01); *F16F 2238/02* (2013.01)

(58) Field of Classification Search
CPC ...... F16F 13/022; F16F 13/007; F16F 13/101; F16F 13/20; F16F 2228/066; F16F 2238/02; B60K 5/1208; B62D 33/0608
USPC .... 267/140.4, 140.13, 140.3, 141, 219, 220, 267/292–294
See application file for complete search history.

(56) References Cited

U.S. PATENT DOCUMENTS

| | | | |
|---|---|---|---|
| 4,712,777 A | 12/1987 | Miller | |
| 5,118,068 A | 6/1992 | Noguchi | |
| 6,017,024 A * | 1/2000 | Muramatsu | F16F 13/20 267/140.14 |
| 6,394,433 B1 * | 5/2002 | Ersoy | F16F 13/26 267/140.14 |
| 8,246,021 B2 | 8/2012 | Shand et al. | |

(Continued)

FOREIGN PATENT DOCUMENTS

| | | |
|---|---|---|
| DE | 3210731 A1 | 10/1983 |
| EP | 2348229 A1 | 7/2011 |
| EP | 2894370 A1 | 7/2015 |

OTHER PUBLICATIONS

International Search Report and Written Opinion issued in PCT/US2017/037757, dated Aug. 29, 2017, 11 pages.

*Primary Examiner* — Pamela Rodriguez
(74) *Attorney, Agent, or Firm* — Faegre Baker Daniels LLP

(57) ABSTRACT

A vibration isolator includes a housing forming an internal cavity, an elastomeric diaphragm within the internal cavity, the elastomeric diaphragm combining with a first end of the housing to form an air spring within the internal cavity, a mechanical spring in series with the air spring within the internal cavity; a mount in series with the mechanical spring opposite the air spring, an annular elastomeric stopper between a second end of the housing and the mount, wherein the mount and the annular elastomeric stopper combine to seal the second end of the housing to form a chamber within the internal cavity between the elastomeric diaphragm and the second end of the housing, and a plate seated on the mount within the chamber.

20 Claims, 2 Drawing Sheets

(56) References Cited

U.S. PATENT DOCUMENTS

| | | | |
|---|---|---|---|
| 2001/0052664 A1* | 12/2001 | Saitoh | F16F 13/106 |
| | | | 267/140.13 |
| 2004/0188902 A1 | 9/2004 | Okanaka et al. | |
| 2008/0179798 A1* | 7/2008 | Saiki | F16F 13/26 |
| | | | 267/140.14 |
| 2009/0008845 A1* | 1/2009 | Tanaka | F15B 15/10 |
| | | | 267/64.15 |

* cited by examiner

VISCOUS ISOLATOR WITH AIR SPRING

TECHNICAL FIELD

This disclosure relates to vibration isolators.

BACKGROUND

Vibration isolators can be used to isolate vibration in mechanical equipment. For example, within a vehicle or other mechanical equipment, vibration isolators can be located between an engine and a frame to mitigate transmission of engine vibrations to the frame. As another example, vibration isolators may be located between the frame and an operator cab to reduce transmission of vibrations between the frame and the operator cab. Various examples of vibration isolators include rubber mounts, spring mounts, viscous mounts, air spring mounts, and viscous spring mounts. Different mounts provide different properties that affect the performance of the vibration isolation.

SUMMARY

As disclosed herein, a vibration isolator can include a low stiffness spring, such as an air spring to reduce the transmission of low frequency vibration. The low stiffness spring can provide a limited range of motion. The limited range of motion may mitigate shaking of mounted structures by limiting the amplitude of the shaking. In addition, the vibration isolator may further include a higher stiffness spring, such as a mechanical spring, in series with the low stiffness spring. Various examples can further incorporate viscous damping. The disclosed vibration isolators may reduce the transmission of low frequency vibration largely with the low stiffness spring, while also limiting shaking with a limited range of motion for the low stiffness spring. The disclosed vibration isolators may further reduce the transmission of high frequency vibrations through the low stiffness spring. The higher stiffness spring may further dampen vibrations that exceed the range of motion of the low stiffness spring. Example applications of the vibration isolators include serving as engine mounts and operator cab mounts.

In one example, this disclosure is directed to a vibration isolator including a housing forming an internal cavity, an elastomeric diaphragm within the internal cavity, the elastomeric diaphragm combining with a first end of the housing to form an air spring within the internal cavity, a mechanical spring in series with the air spring within the internal cavity; a mount in series with the mechanical spring opposite the air spring, an annular elastomeric stopper between a second end of the housing and the mount, wherein the mount and the annular elastomeric stopper combine to seal the second end of the housing to form a chamber within the internal cavity between the elastomeric diaphragm and the second end of the housing, and a plate seated on the mount within the chamber.

In another example, this disclosure is directed to a vibration isolator including a cylindrical housing forming an internal cavity, an elastomeric diaphragm within the internal cavity, the elastomeric diaphragm combining with a first end of the housing to form an air spring within the internal cavity, a mechanical coil spring in series with the air spring within the internal cavity, a metal mount in series with the mechanical coil spring opposite the air spring, an annular elastomeric stopper between a second end of the housing and the mount, wherein the mount and the annular elastomeric stopper combine to seal the second end of the housing to form a chamber within the internal cavity between the elastomeric diaphragm and the second end of the housing, a first plate seated on the mount within the chamber, a second plate adjacent the second end of the housing, the second plate being fixed relative to the housing and dividing the chamber into a first portion and a second portion, the first portion including the first plate and the mechanical coil spring and the second portion including a portion of the mount, wherein the mount extends into the first portion of the chamber to contact the mechanical coil spring.

The details of one or more examples of this disclosure are set forth in the accompanying drawings and the description below. Other features, objects, and advantages associated with the examples may be apparent from the description and drawings, and from the claims.

DETAILED DESCRIPTION

Vibration isolators, such as those used to mount engines to vehicle or machinery frames or those used to mount operator cabs to vehicle or machinery frames, are in common use. However, mitigating the transfer of low frequency vibrations, such as vibrations below 15 Hz, remains a challenge. While vibration mounts with a soft mounting stiffness can mitigate the transfer of low frequency vibrations, but may produce a side-effect of undesirable shaking. Such undesirable shaking is generally low frequency, such as 5 Hz or less, and may occur in one or more dimensions such as roll, pitch and/or yaw. Some example vibration isolators disclosed herein can be configured to mitigate the transfer of low frequency vibrations, while also including viscous damping and providing stiffness to mitigate shaking, such as side-to-side shaking, during operation.

Figure 1:
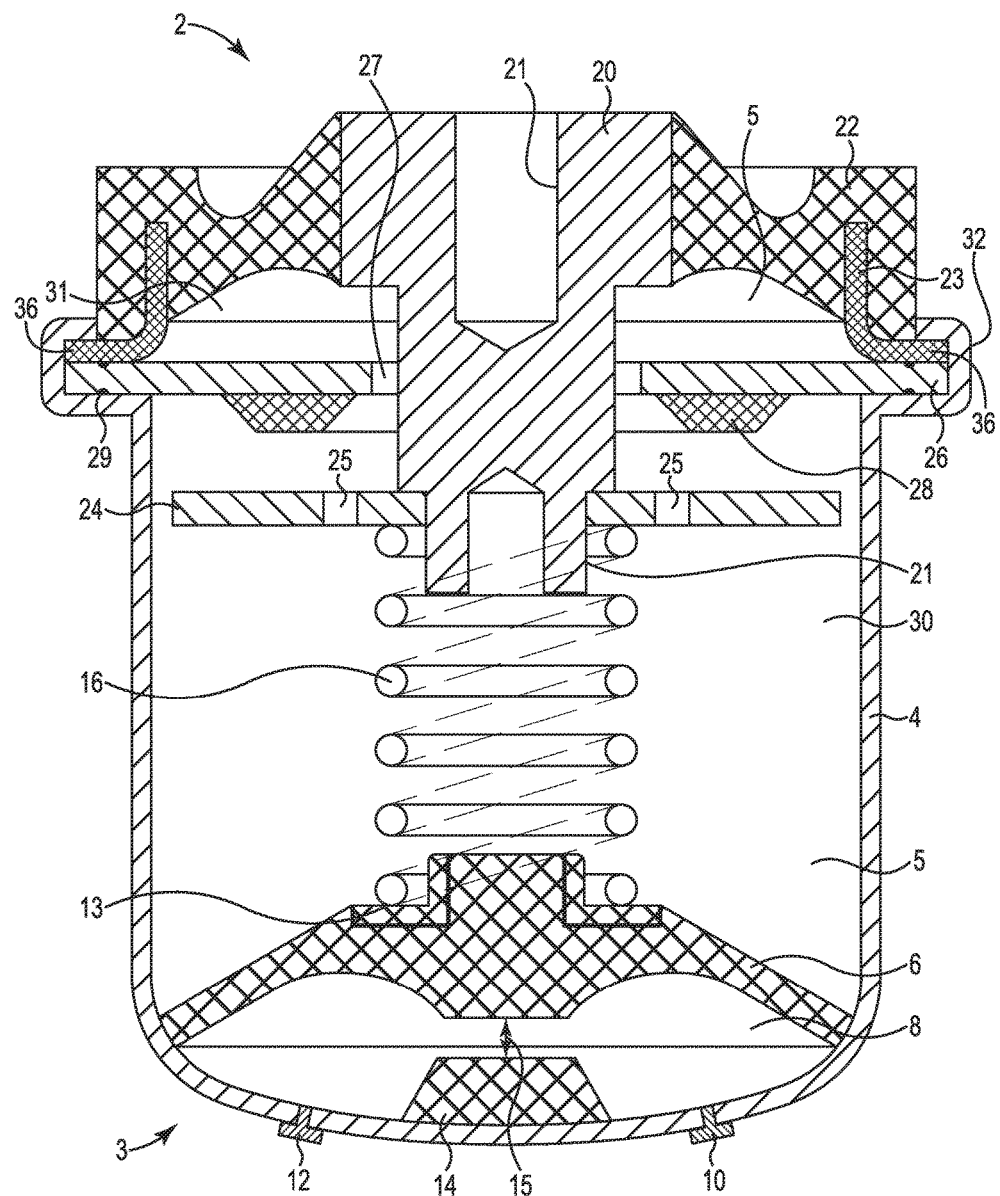
FIG. 1 illustrates a cross-sectional view of a vibration isolator in accordance with an example of this disclosure.
Figure 2:
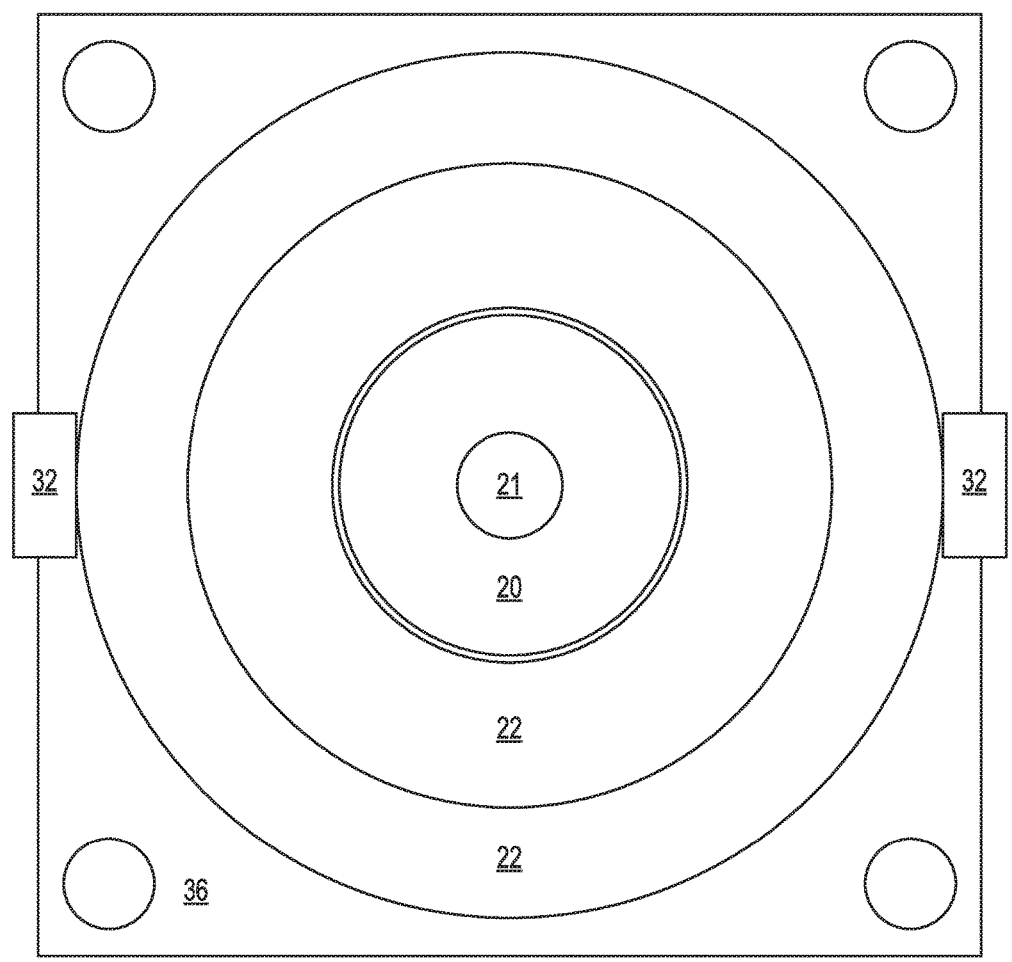
FIG. 2 illustrates a top view of a vibration isolator in accordance with an example of this disclosure.

FIG. 1 illustrates a cross-sectional view of vibration isolator 2, and FIG. 2 illustrates a top view of vibration isolator 2. Vibration isolator 2 includes housing 4 and mount 20. Vibration isolator 2 is configured to mitigate the transfer of vibrations between plate 36, which is fixed relative to housing 4, and mount 20. Generally, plate 36 will be attached to a frame or mount structure while mount 20 is attached to the object to be isolated, such as an engine or cab. In some examples, mount 20 may be a metal insert and may include threaded hole 21 (as shown in FIG. 1) or another mounting structure such as a through hole, threaded shaft or other mounting structure.

Housing 4 may be formed from a metal such as a stamped, machined or cast metal. In the same of different examples, housing 4 may be a cylindrical housing with one closed end. Mounting structures, such as plate 36 (FIG. 2) connect housing 4 to a first element of mechanical equipment and metal insert 20, which connects to a second element of the mechanical equipment. Plate 36 included through holes for mounting, although other mounting techniques to secure plate 36 to the first element of the mechanical equipment may be used as well. In some examples, the first and second elements may include a frame and engine and/or or a frame and operator cab. Vibration isolator 2 operates to mitigate the transmission of vibrations between the mounting structures of plate 36 and metal insert 20.

Vibration isolator 2 includes air spring 3 in series with mechanical spring 16 and annular elastomeric stopper 22, which provides a shear stiffness between mount 20 and housing 4. Air spring 3 can be a lower stiffness spring than mechanical spring 16, although mechanical spring 16 can have a larger range of motion than air spring 3 to mitigate higher amplitude vibrations. Housing 4 forms internal cavity 5, and both air spring 3 and mechanical spring 16 are located within internal cavity 5. Elastomeric diaphragm 6 is located within internal cavity 5, and elastomeric diaphragm 6 combines with the end of housing 4 to enclose a portion of internal cavity 5 to form chamber 8 of air spring 3. In some examples, elastomeric diaphragm 6 can be formed from a rubber material. The stiffness of air spring 3 depends on the design and material properties of elastomeric diaphragm 6, as well as a pressure within chamber 8. In general, increasing pressure within chamber 8 increases the stiffness of air spring 3. Conversely, reducing pressure within chamber 8 generally reduces the stiffness of air spring 3.

Vibration isolator 2 can further include one or more optional air regulating valves within housing 4 facilitating pressure adjustments within chamber 8. In the example of FIG. 1, vibration isolator 2 includes two air regulating valves: air charge valve 10 and pressure relief valve 12. Air charge valve 10 is configured to connect to an air pressure source to facilitate increasing pressure within chamber 8. Pressure relief valve 12 is controllable to release pressure within chamber 8. In some examples, air charge valve 10 and/or pressure relief valve 12 may be manually operated. In the same or different examples, air charge valve 10 and/or pressure relief valve 12 may be operated according to electronic signals, such as those provided by a digital or analog controller configured to adjust the pressure within chamber 8 according to a control algorithm. In such examples, the control system may further include one or more sensors to sense pressure within chamber 8 and/or sense vibrations on either side of vibration isolator 2 to evaluate the performance of vibration isolator 2, for example, as part of a closed-loop control system. Air spring 3 can be generally configured to reduce the transmission of low frequency vibration by providing a relatively low stiffness for vibration isolator 2.

In addition, vibration isolator 2 also includes mechanical spring 16 in series with air spring 3. Mechanical spring 16 can be a higher stiffness spring than air spring 3, and mechanical spring 16 can have a larger range of motion than air spring 3 to mitigate higher amplitude vibrations. In the example of FIG. 1, mechanical spring 16 is a mechanical helical coil spring, although other spring configurations may also be used for mechanical spring 16. Mechanical spring 16 extends between mount 20 and elastomeric diaphragm 6 and is seated both on spring seat 13 of elastomeric diaphragm 6 and on spring seat 21 of mount 20. As shown in FIG. 1, mechanical spring 16 is in series with air spring 3 within internal cavity 5 of housing 4. Mount 20 is likewise in series with mechanical spring 16 opposite air spring 3. Mount 20 is configured to be coupled to an element of machinery incorporating vibration isolator 2, such as an engine, frame and/or operator cab.

Vibration isolator 2 can incorporate viscous damping in combination with mechanical spring 16, air spring 3 and the shear stiffness of annular elastomeric stopper 22. Vibration isolator 2 includes annular elastomeric stopper 22 within internal cavity 5 in the end of housing 4 opposite air spring 3. Annular elastomeric stopper 22 surrounds mount 20 and is between the end of the housing and mount 20. Annular elastomeric stopper 22 combines with mount 4 to substantially seal the open end of internal cavity 5 to form a chamber that may contain a viscous fluid.

Metal insert 23 includes a first portion embedded within annular elastomeric stopper 22, and a second portion sealed to the end of housing 4 in conjunction with plate 26 via seals 29. Seals 29 are on either side of plate 26 with a first seal sealing an interface between plate 26 and J-channel 32 of housing 4 and a second seal sealing an interface between plate 26 and metal insert 23. For example, seals 29 may extend about the entire perimeter of plate 26 on either side of plate 26.

Plate 24, which is seated on mount 20 within internal cavity 5 and is between mount 20 and mechanical spring 16, can interact with the viscous fluid to provide viscous damping for mechanical spring 16. Plate 26 is secured to housing 4 between plate 24 and annular elastomeric stopper 22. Plate 26 fixed relative to housing 4 and divides chamber 5 into first portion 30 and second portion 31. First portion 30 includes plate 24 and mechanical spring 16, and second portion 31 including a portion of mount 20. Mount 20 extends through central aperture 27 in plate 26 to contact mechanical spring 16, which is seated on spring seat 21 of mount 20. Plate 26 further interacts with the flow of the viscous fluid, such as flow imparted on the viscous fluid by the motion of plate 26 and mount 20 to affect the viscous damping properties of vibration isolator 2. Plate 24 includes holes 25, which may be designed to provide desired viscous damping properties of vibration isolator 2. For example, the size, shape, location, number of holes 25 may be selected according to desired viscous damping properties.

Elastomeric stopper 28 is mounted on the side of plate 26 facing plate 24. Elastomeric stopper 28 functions to limit the motion of travel of mount 20 and plate 24. In addition, plate 26 includes an oversized central aperture 27 which allows flow of viscous fluid to pass from a first portion 30 of internal cavity 5 on one side of plate 26 to a second portion 31 of internal cavity 5 on the opposing side of plate 26. Central aperture 27 further serves to limit the side to side motion of mount 20, e.g., to mitigate shaking of mount 20 relative to housing 4. For example, central aperture 27 may limit motion of mount 20 relative to housing 4 in directions transverse to a central axis of mechanical spring 16.

As low stiffness springs, such as air spring 3, can produce an undesirable side-effect of shaking in response to mechanical excitation, such as vibration, air spring 3 may include one or more features to mitigate shaking. Such shaking may include roll, pitch and/or yaw and occur in orientations along a major axis of vibration isolator 2, the major axis corresponding to the direction of the largest degree of freedom for vibration isolator 2, and/or directions transverse the major axis of vibration isolator 2. In some examples, the major axis of vibration isolator 2 may correspond to the central axis of mechanical spring 16.

Air spring 3 can provide a limited range of motion. The limited range of motion may mitigate shaking of mounted structures by limiting the amplitude of the shaking. For example, vibration isolator 2 further includes stopper 14 secured to an internal surface of housing 4 within chamber 8. Stopper 14 limits the motion of elastomeric diaphragm 6 in a direction toward the end of housing 4. In a neutral position, gap 15 is between stopper 14 and elastomeric diaphragm 6, although the distance of gap 15 may depend on pressure within chamber 8 as well as a load on vibration isolator 2. Under a mechanical load, such a vibration, other dynamic load or static load, elastomeric diaphragm 6 may deflect such as gap 16 increases and/or decreases. If and when stopper 14 and elastomeric diaphragm 6 contact under load, air spring 3 has limited effect on further vibration isolation although stopper 14 may be formed from a deformable material, such as an elastomeric material, such that it may allow further deflection beyond the elimination of gap 15.

Gap 15 can be configured for a small amplitude of vibration or shaking, once the amplitude of the vibration reaches a certain level or deformation of diaphragm 6 reaches the stopper 14, the diaphragm 12 will engage with stopper 14 and gap 15 will be eliminated due to the vibration. Then the spring 16 and annular elastomeric stopper 22 perform the major role for the isolation. The limited range of motion for air spring 3 prevent excessive shaking of the cab or engine. The cavity 5 can be filled with a viscous fluid to counter act with vibration by adding more viscous damping during the vibration.

In addition, annular elastomeric stopper 22 provides a compression and elongation stiffness between mount 20 and housing 4 to limit side to side shaking of mount 20. In addition, central aperture 27 of plate 26 further serves to limit the side to side motion of mount 20, e.g., to mitigate shaking of mount 20 relative to housing 4 and to axially constrain mount 20 as is moves about parallel to the major axis of spring 16.

Both portion 30 and portion 31 of cavity 5 may be filled with viscous fluid with some air trapped in to avoid compression of the viscous fluid. The viscous fluid can pass thought plate 26 and interact with plate 24 to generate the viscous damping. The vibration force will pass through metal insert 20, spring 16, and diaphragm 6. The initial isolator stiffness is a combination of annular elastomeric stopper 22 shear stiffness, spring 16, and air spring 3. When diaphragm 6 touches the stopper 14, the isolator stiffness will be determined by both spring 16 and annular elastomeric stopper 22 shear.

Various examples have been described. These and other examples are within the scope of the following claims.

What is claimed is:

1. A vibration isolator comprising:
   a housing forming an internal cavity;
   an elastomeric diaphragm within the internal cavity, the elastomeric diaphragm combining with a first end of the housing to form an air spring within the internal cavity;
   a mechanical spring in series with the air spring within the internal cavity;
   a mount in series with the mechanical spring opposite the air spring;
   an annular elastomeric stopper between a second end of the housing and the mount, wherein the mount and the annular elastomeric stopper combine to seal the second end of the housing to form a chamber within the internal cavity between the elastomeric diaphragm and the second end of the housing; and
   a plate seated on the mount within the chamber,
   wherein the elastomeric diaphragm includes a first spring seat for a first end of the mechanical spring,
   wherein the mount includes a second spring seat for a second end of the mechanical spring, and
   wherein the plate is seated on the second spring seat between the mount and the second end of the mechanical spring.

2. The vibration isolator of claim 1, further comprising a viscous fluid within the chamber, wherein the plate and the viscous fluid combine to provide viscous damping.

3. The vibration isolator of claim 1, further comprising an air regulating valve within the first end of the housing, the air regulating valve being configured to facilitate air pressure adjustments for the air spring.

4. The vibration isolator of claim 1, further comprising a stopper mounted on the first end of the housing within the internal cavity, the stopper being configured to limit motion of the elastomeric diaphragm.

5. The vibration isolator of claim 1, wherein the plate is a first plate, the vibration isolator further comprising a second plate adjacent the second end of the housing, the second plate being fixed relative to the housing and dividing the chamber into a first portion and a second portion, the first portion including the first plate and the mechanical spring, and the second portion including a portion of the mount,
   wherein mount extends into the first portion of the chamber to contact the mechanical spring.

6. The vibration isolator of claim 5, further comprising a stopper mounted on the second plate within the first portion of the chamber, the stopper being configured to limit motion of the first plate within the internal cavity.

7. The vibration isolator of claim 5, wherein the second plate is an annular plate and is configured to limit motion of the mount relative to the housing in directions transverse to a central axis of the mechanical spring.

8. The vibration isolator of claim 5, further comprising a metal insert including a first portion embedded within the annular elastomeric stopper, and a second portion sealed to the second end of the housing.

9. The vibration isolator of claim 1, wherein the annular elastomeric stopper provides shear stiffness between the mount and the housing in series with the mechanical spring and the air spring.

10. The vibration isolator of claim 1, wherein the mount is a metal insert.

11. The vibration isolator of claim 1, wherein the mechanical spring is a mechanical coil spring.

12. The vibration isolator of claim 1, further comprising a mounted on the first end of the housing and secured to an internal surface of the housing.

13. The vibration isolator of claim 1, further comprising a stopper mounted on the first end of the housing to form a gap with the elastomeric diaphragm when the vibration isolator is in a neutral position.

14. The vibration isolator of claim 1, further comprising a stopper mounted on the first end of the housing and formed from an elastomeric material.

15. A vibration isolator comprising:
    a cylindrical housing forming an internal cavity;
    an elastomeric diaphragm within the internal cavity, the elastomeric diaphragm combining with a first end of the housing to form an air spring within the internal cavity;
    a mechanical coil spring in series with the air spring within the internal cavity;
    a metal mount in series with the mechanical coil spring opposite the air spring;
    an annular elastomeric stopper between a second end of the housing and the mount, wherein the mount and the annular elastomeric stopper combine to seal the second end of the housing to form a chamber within the internal cavity between the elastomeric diaphragm and the second end of the housing;
    a first plate seated on the mount within the chamber; and
    a second plate adjacent the second end of the housing, the second plate being fixed relative to the housing and dividing the chamber into a first portion and a second portion, the first portion including the first plate and the mechanical coil spring and the second portion including a portion of the mount, wherein the mount extends into the first portion of the chamber to contact the mechanical coil spring, wherein the elastomeric diaphragm includes a first spring seat for a first end of the mechanical coil spring, wherein the mount includes a second spring seat for a second end of the mechanical coil spring, and wherein the first plate is seated on the second spring seat between the mount and the second end of the mechanical coil spring.

16. The vibration isolator of claim 15, further comprising a stopper mounted on the second plate within the first portion of the chamber, the stopper being configured to limit motion of the first plate within the internal cavity.

17. The vibration isolator of claim 15, wherein the second plate is an annular plate and is configured to limit motion of the mount relative to the housing in directions transverse to a central axis of the mechanical coil spring.

18. The vibration isolator of claim 15, further comprising a viscous fluid within the chamber, wherein the first plate and the viscous fluid combine to provide viscous damping.

19. The vibration isolator of claim 15, further comprising an air regulating valve within the first end of the housing, the air regulating valve being configured to facilitate air pressure adjustments for the air spring.

20. The vibration isolator of claim 15, further comprising a stopper mounted on the first end of the housing and secured to an internal surface of the housing.

\* \* \* \* \*